Oct. 9, 1923.
E. B. LOCKE
1,470,016
WEIGHING SCALE
Filed Oct. 30, 1920
2 Sheets-Sheet 2
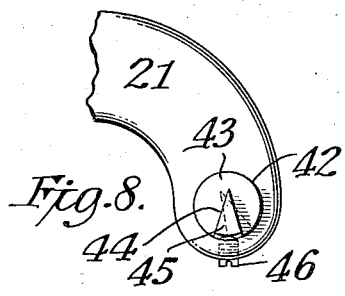
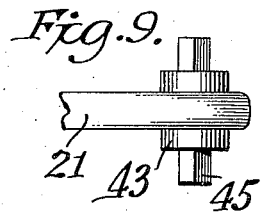
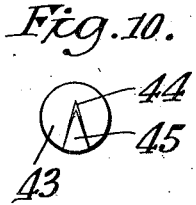
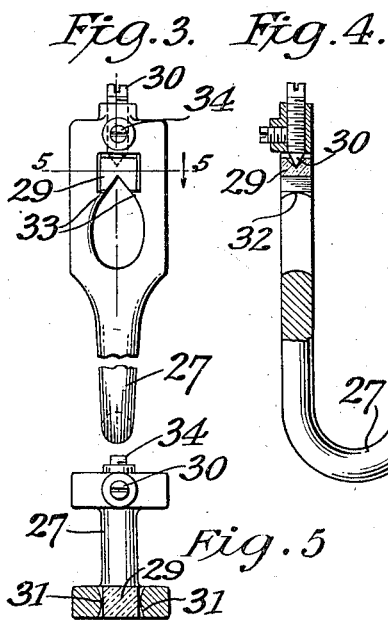
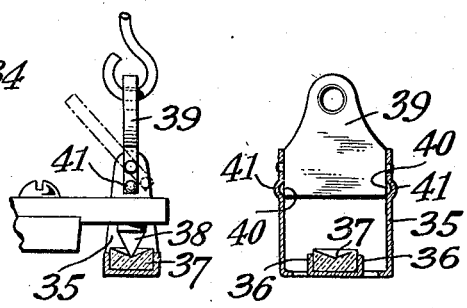
INVENTOR
Edward B Locke
BY
Kerr Page Cooper & Hayward
ATTORNEYS Patented Oct. 9, 1923.

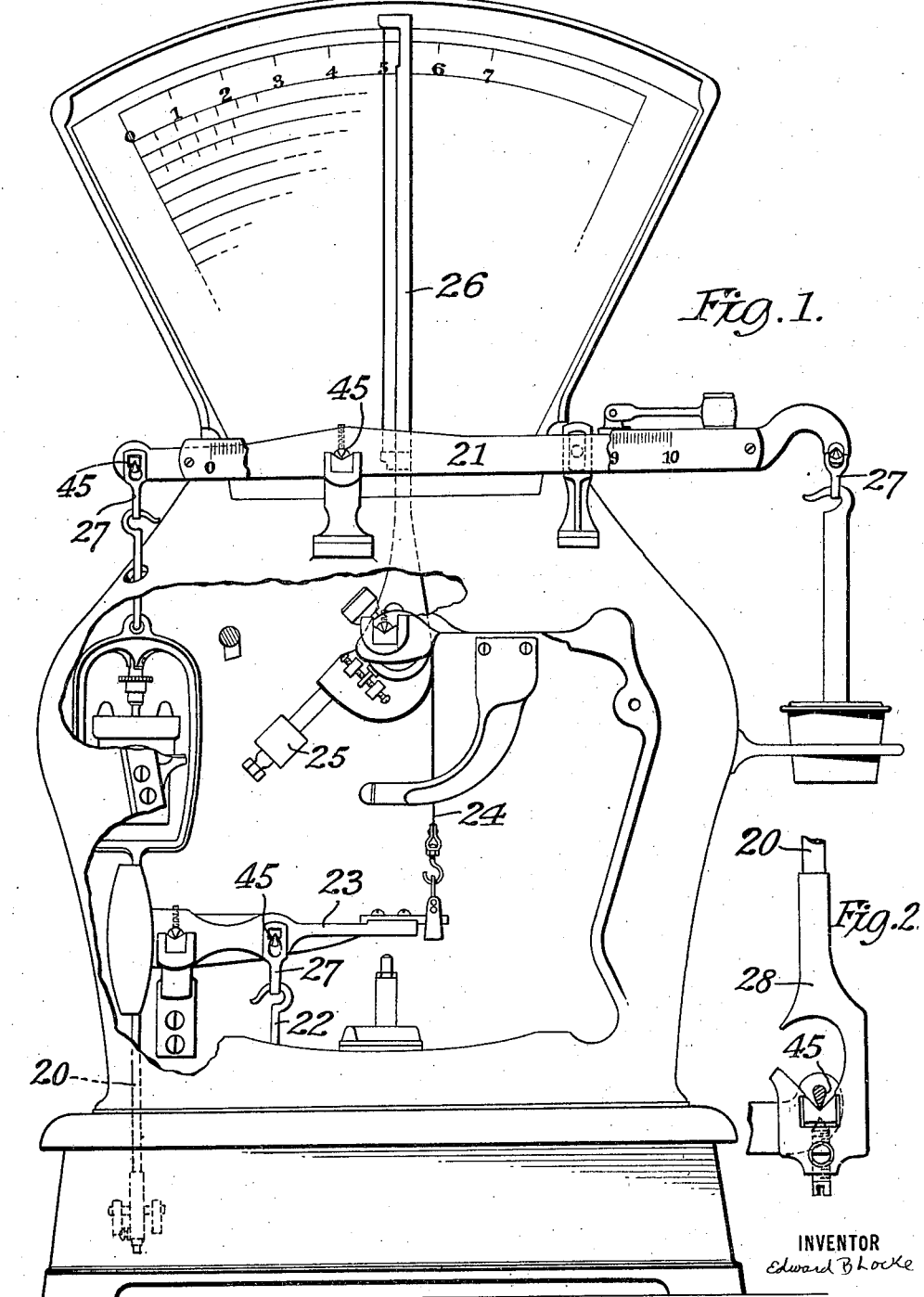

1,470,016

UNITED STATES PATENT OFFICE.

EDWARD B. LOCKE, OF DETROIT, MICHIGAN, ASSIGNOR, BY MESNE ASSIGNMENTS, TO DAYTON SCALE COMPANY, OF DAYTON, OHIO, A CORPORATION OF NEW JERSEY.

WEIGHING SCALE.

Application filed October 30, 1920. Serial No. 420,588.

*To all whom it may concern:*

Be it known that I, EDWARD B. LOCKE, a citizen of the United States of America, residing at Detroit, in the county of Wayne and State of Michigan, have invented certain new and useful Improvements in Weighing Scales, of which the following is a full, clear, and exact description.

This invention relates to improvements in weighing scales and more particularly to the improvement of certain details of construction to the end that the final assembling and sealing of the scale may be effected in the most expeditious manner.

The particular details will be more fully described in the accompanying specification and illustrated in the drawings, in which Fig. 1 shows a scale to which my improvements are applied.

Fig. 2 shows a detail enlarged view of the steelyard with improved agate bearing support therein.

Fig. 3 shows a side view of one of the loops employing this bearing.

Fig. 4 is a side view of the loop shown in Fig. 3, one half of the same being shown in central section.

Fig. 5 is a view looking down on the top of the loop with one branch shown in section. The cross-sectional view is taken on line 5—5 of Fig. 3.

Figs. 6 and 7 are detail views of an improved stirrup used in this type of scale.

Figs. 8, 9 and 10 show detail views of a pivot adjusting means which is utilized for the lever pivots and for other locations where a knife edge bearing is to be mounted.

The scale to which my improvements are applied is generally known to the trade as a Detroit No. 75 scale. This scale is fully described in Hopkinson and Ozias Patent No. 867,671. This scale includes a base lever system (not shown) from which a steelyard 20 extends to and connects through a loop bearing and knife edge with a fulcrumed beam 21. A supplementary steelyard 22 extends from the base lever system and connects through a loop and knife edge bearing with an intermediate lever 23, which through a stirrup connects with a tape 24 which actuates the pendulum automatic load counterbalancing means 25 and pivotal indicator 26. The loops used with the different knife edges are identical and those of the double branch type are marked 27. Those employing a single branch are designated 28. These single branch loops, which are used upon the lower ends of steelyards 20 and 22, are open-sided as shown in Fig. 2. In other respects the loops are identical and a description of the floating agate construction employed for the double loop will also apply to the part marked 28.

In practice it has been found desirable to provide a floating bearing so that the agate bearing will properly line up with the knife edge even should this knife not be exactly horizontal or in proper alignment. I accordingly provide the agate bearing 29 with a conical socket to receive the pointed end of a set screw 30. The sides of the agate are flat and are free to rock about the arcuate surfaces 31 of the loop body portion (see Fig. 5) and the lower straight edges of the agate are likewise free to rock about the arcuate surface 32 of shoulders 33 of the body portion (see Figs. 4 and 3). In this way the agate will be free to adjust itself to the line of the knife edge pivot. When the bearing has been properly lined up the set screw 30 is tightened and if desired it may be locked by a locking screw 34. After the set screw 34 is once tightened, the agate is secured in place by the shoulders 32 and the conically pointed set screw 30.

In scales of this class the stirrup is intended to provide a detachable and frictionless connection between the nose of the intermediate lever and the tape 24. The type of stirrup formerly used was of the form shown in the Riedel and Barnes Patent No. 1,196,027. The present stirrup is an improvement upon the stirrup there shown and comprises a U-shaped stamping 35 with struck up ears or lugs 36 to hold the conically cupped agate 37 in place. This agate cooperates in the usual manner with a conical point 38 carried by the nose piece of the lever. For connecting the stirrup to the tape hook an intermediate plate 39 is provided. This plate is apertured to receive the tape hook and is pivotally mounted in holes drilled in the side plates of the U-member (see Fig. 7).

Figs. 6 and 7 show the normal position of the plate which is held against tilting by projections 40 engaging in depressions 41 in the U-member. With the plate in this position the nose iron is prevented from becoming entirely disconnected by reason of the spacing of the bottom of plate 39 from the top of the nose iron. Should it be desired to disconnect the stirrup and nose iron, sufficient pressure is applied to force the projections out of the depressions and allow the plate to be tilted and removal to be effected.

The dotted line position of plate 39 in Fig. 6 shows this operation.

One of the most troublesome operations in scale building is the sealing of the levers. Notwithstanding the fact that the scale builder has located his pivots at the theoretically correct positions he will find that the levers do not balance and it becomes necessary to adjust the pivots in some manner. This operation is known as sealing the lever and is usually carried out by hammering the pivots to bend them slightly and afterwards grinding the edges. Such operations are time consuming and add greatly to assembly expense.

Figs. 8, 9 and 10 show a method of pivot mounting which eliminates many of these difficulties.

The lever or other member 21 which is to carry a pivot is first drilled with a straight round hole 42. Within this hole is placed a bushing 43 preferably of brass and fitting the hole with a "slip" or snug fit. The bushing is provided with a V-shaped notch 44. The angle of the sides of this notch is slightly less than the angle between the sides of the knife edge 45 (See Fig. 10). The knife edge 45 is slipped into the notch in the bushing, and these two parts are inserted in the hole 42 in the lever. Thereafter a set screw 46 is tightened. This set screw bears down upon the arcuate top of the knife edge and spreads the bushing 43 so as to clamp it tightly in the hole in the lever. Should it be found necessary to shift the location of the knife edge point the assembler loosens the set screw and by means of pliers or other suitable tool twists the knife edge to the right or left until the proper setting is obtained. Thereafter the set screw is tightened and the knife edge pivot is retained in the position to which it has been set.

What I claim is:

1. A support for an agate bearing comprising a body portion, said portion having integral shoulders provided with arcuate surfaces upon which the agate rests, said surfaces being co-extensive in length with the breadth of the holder body portion, and a set screw carried by the body portion to clamp the agate against said shoulders.

2. A support for a straight sided agate bearing comprising, in combination with a straight side agate bearing, of a supporting body portion therefor, said portion being provided with an agate receiving opening and arcuate surfaces at the sides of said opening about which the agate is adapted to directly rock.

In testimony whereof I hereto affix my signature.

EDWARD B. LOCKE.